United States Patent [19]
Wyss

[11] Patent Number: 5,136,911
[45] Date of Patent: Aug. 11, 1992

[54] HAND STRETCHER FOR MUSICIANS

[76] Inventor: John R. Wyss, 4020 148th Ave. NE., Suite F, Redmond, Wash. 98052

[21] Appl. No.: 519,504

[22] Filed: May 4, 1990

[51] Int. Cl.⁵ ............................................. A63B 5/00
[52] U.S. Cl. ...................................... 84/468; 84/467; 482/48; 482/907
[58] Field of Search ................... 84/467, 468; 272/67, 272/68, 93, 116, 135; 128/25 R, 26, 77, 87 A

[56] References Cited
U.S. PATENT DOCUMENTS

| | | | |
|---|---|---|---|
| 623,235 | 4/1899 | Crane | 272/67 |
| 806,681 | 12/1905 | Kursheedt | 272/67 |
| 886,591 | 5/1908 | Finger | 272/67 |

FOREIGN PATENT DOCUMENTS

| | | | |
|---|---|---|---|
| 11689 | of 1905 | United Kingdom | 272/67 |
| 167484 | 1/1922 | United Kingdom | 84/467 |

Primary Examiner—Richard J. Apley
Assistant Examiner—Glenn E. Richman

[57] ABSTRACT

An exercise device for musicians is provided which effects the forcible spreading of the fingers and thumb of the hand by a series of rings mounted upon two track-like members, upon the first track being four finger rings, and upon the second track being a ring for the thumb, each ring being movable along its track and having locking device for the purpose of positioning the thumb and fingers into forcibly spread-apart positions, and locking that position such that the musician can increase the operable reach of the hand.

1 Claim, 1 Drawing Sheet

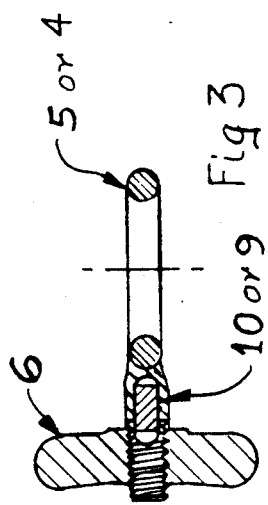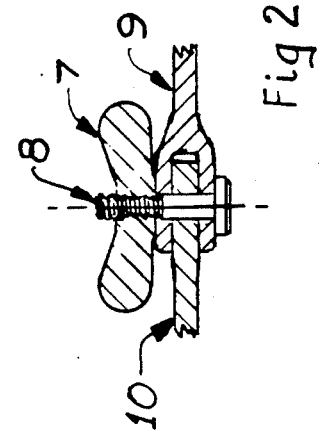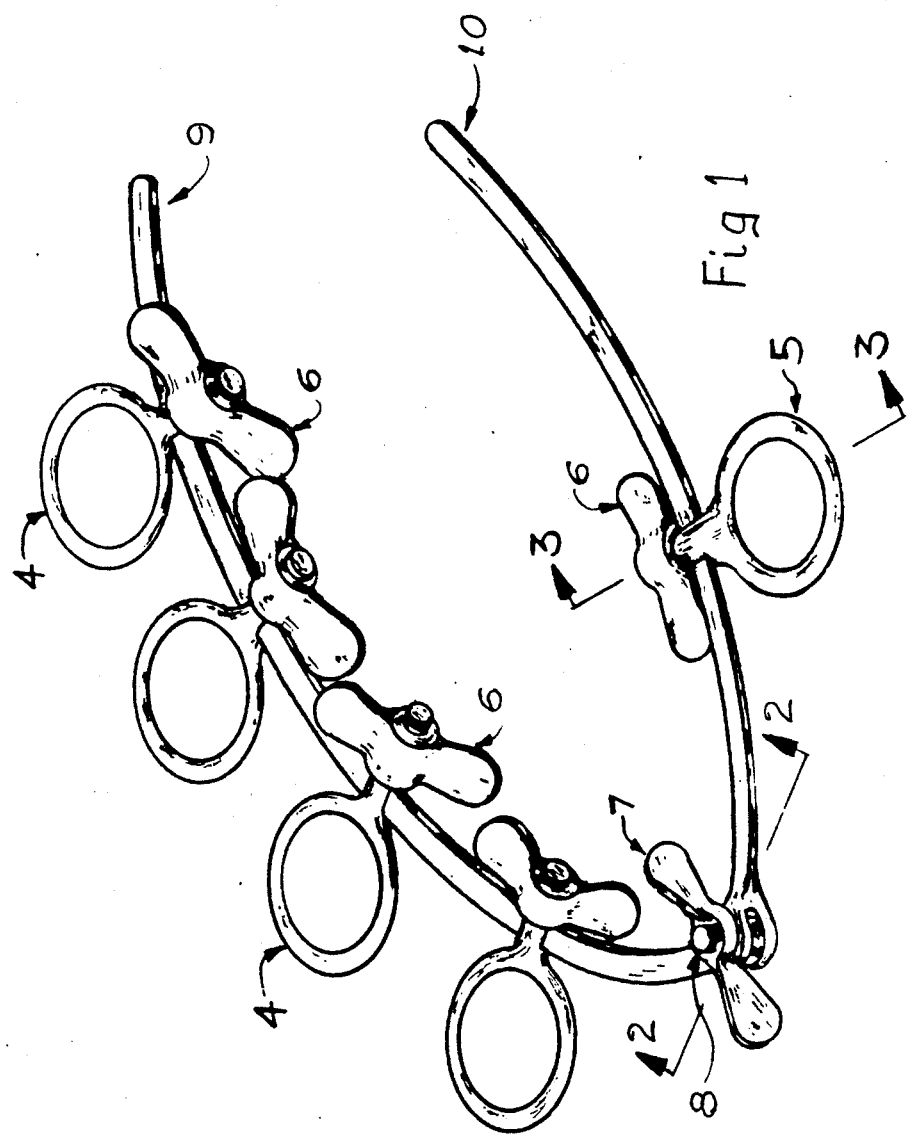

HAND STRETCHER FOR MUSICIANS

BACKGROUND

This invention relates to exercise devices that musicians use to adapt their fingers to the playing of their instrument. The musicians which play stringed instruments, keyboard instruments, and wind instruments realize that dexterity and the ability to stretch the hand and extend the reach of the fingers is critical to the proper execution of many musical passages upon the instrument.

Noted in prior art are exercise devices and apparatus designed to resist finger movements, thereby building muscles. Bonasera, U.S. Pat. No. 4,765,608, filed Aug. 23, 1988, is one such device. Pneumatics are employed in a number of prior devices, all primarily to enhance overall strength within the hand, or as a therapeutic aid in cases of damaged tendons and their related muscles in the carpal region. Hasegawa, U.S. Pat. No. 4,619,250, filed Oct. 28, 1986 is an example.

This invention spreads the hand and thereby the reach of the fingers, and if the musician will devote himself to a regimen of practice with an instrument and use of the exercise apparatus herein described greater manual dexterity and ability to spread the fingers are achieved. This ultimately assists a dedicated musician in developing greater musical skills in execution of difficult passages.

All developing and advanced musicians will benefit similarly, because the ability to extend the fingers and maintain control during extreme reaches of the fingers is crucial to the execution of many important and complex musical passages upon a wide variety of instruments.

SUMMARY OF THE INVENTION

It is therefore an object to provide the dedicated musician a device which extends the reach of the fingers by forcibly stretching the hand, and the related joints, muscles and tendons, and holding the stretched position of the hand and fingers to condition said hand and the parts of the hand to spread to a wider distance than naturally possible by the musician prior to use of the device, such that the musician may improve in the playing of musical passages which require maintenance of superior muscle control of the hand throughout extended and difficult reaches in the execution thereof.

It is also an object for the device described herein to be generally used to force the skin, knuckle joints, muscles and tendons of the hand and fingers to become stretched by maintenance of an unnaturally extended position in which said hand and parts are forcibly stretched beyond normal and natural limits in order to extend said limits for the benefits stated herein.

By an array of rings into which a musician places the fingers and thumb of the hand desired to be stretched, said rings being mounted adjustably in a track fashion, such that the fingers all provide cross-sectional support by effectively pushing against each other through the track and rings structure as assembled and when the positions of the spread out fingers and thumb in the rings are locked in place along the track, exerting outward pressure which spreads and holds the hand and fingers in an abnormally wide spread-apart position, the stretching is affected, and the musician is provided the benefits herein described.

It is especially noted that the apparatus is intended for the sole purpose of forcibly straining the reach of the fingertips and thumb, and this extreme sustained straining threatens with the likely effect of damaging healthy hands if used improperly or not applied in strict accordance to sensible use, and should never be applied to hands which are already damaged or are infirm. However, on the hands of devoted musicians, when used in a regular program which includes practice with an instrument, a marked improvement in the execution of difficult musical passages involving finger stretches, sustained reaches of the thumb and fingers, and like actions, will be availed.

The following preferred embodiment is of simple design, and conceivable changes to improve confortable fitting, or improved methods of locking the extended finger and thumb positions can all be easily achieved, therefore the description is intended to be broadly construed, and the design in general is subordinate to the net effect of the device herein described as "Hand Stretcher For Musicians".

BRIEF DESCRIPTION OF THE DRAWING FIGURE

FIG. 1 is a side view of the hand stretcher illustrating the adjustable features of the hand stretcher.

FIG. 2 Hinge Assembly.

FIG. 3 Ring Locking Means.

Refer now to FIG. 1. The hand Stretcher is manufactured from rigid material, and comprised of two rod-like track members, 9 and 10; four finger rings, 4, and a thumb ring, 5, ring locking means, 6; such as wing nut set screws fastening to threads as shown in FIG. 3.

Refer now to FIG. 2 wherein a hinge, 8, connects at the intersection between the two rod-like track members wherein hinge locking means, 7, such as wing nut set screws, fasten to threads as is shown in FIG. 2.

Each one of the four rings, 4, corresponds to one of the four fingers, and ring 5, corresponds to the thumb.

Refer now to FIG. 3. A series of four finger rings, 4, each corresponding to one of four fingers of the musician's hand, are adjustably mounted upon a track, 9, or 10, which is comprised of a rigid elongated rod-like member, such that the rings, 4 or 5, may move laterally upon their respective track, rings 4 on track 9, and ring 5 upon track 10, as previously described.

Said first track, 1, is coupled by hinge means, 8, to a second track, 2, similar to the first, said hinge means having a second means of being locked into position, such as a wing nut set screw, 19. A ring, 7, corresponding to the thumb is adjustably mounted upon the second track, 2, in a fashion similar to the mounted rings 3 to 6, and having similar locking means, 9.

The musician using the apparatus inserts fingers and thumb into the corresponding rings, such that the thumb is inserted into ring 7, forefinger in ring 6, and so on to the pinky finger which is inserted into ring 3. The rings must fit snugly to prevent slippage in order for the apparatus to be effective. Using the other hand or an assistant, each ring is then successively spread apart by forcibly extending the rings as remotely as possible from each other and then locking the rings in place upon the track, and the first and second tracks are forcibly spread as remotely as possible by spreading the hinged connection and locking its position with said second locking means, 19, for the purpose of spreading and stretching the reach of the thumb and fingers to unnaturally extended positions. The order in which the rings and tracks are spread and locked is not of critical importance, but it is recommended that the rings and tracks be gradually adjusted and locked in place upon the track so as to cause slight discomfort, fully extending the reach of all fingers and the thumb, thereby effecting the benefits to the musician stated herein.

Therefore the hand is positioned such that the fingers and the thumb are completely and unnaturally extended in a spread fashion, and locked with sustained outward force upon each finger and the thumb via the rings holding the fingers and thumb, the tracks holding the rings, all forcibly spread out and locked into place.

Having thus described the "Hand Stretcher For Musicians" I claim:

1. In an exercise device for musicians, apparatus which forcibly holds the fingers and the thumb of the hand extended to an unnaturally spreadout out position, said apparatus comprising a series of four finger rings with locking means adjustably mounted upon a rigid first track member, connected by a hinge having a second locking means to a second rigid track with a thumb ring with locking means adjustably mounted upon the second rigid track, said adjustable locking means being for the purpose of locking in place said forcibly extended positions of the fingers and the thumb and thereby eventually effecting an extension of the operable reach of the fingers and the thumb of the musician's hand.

* * * * *